Nov. 24, 1970   J. BECH   3,542,528
END MILL WITH VARIABLE CUTTING DIAMETER
Filed March 29, 1968   2 Sheets-Sheet 1

INVENTOR
JORGEN BECH

BY
ATTORNEYS

United States Patent Office 3,542,528
Patented Nov. 24, 1970

3,542,528
END MILL WITH VARIABLE CUTTING DIAMETER
Jorgen Bech, Dyregaardsvej 6,
Kgs. Lyngby, Denmark
Filed Mar. 29, 1968, Ser. No. 717,249
Claims priority, application Germany, Nov. 21, 1967,
B 73,564
Int. Cl. B26d 1/12
U.S. Cl. 29—103          6 Claims

ABSTRACT OF THE DISCLOSURE

The invention provides a variable diameter end mill, especially for routing and trimming printing plates, such end mill having a casing adapted to be secured to a rotary driving spindle, and a tool bit holder mounted in the casing for pivoting movement about an axis at right angles to the rotary axis of the end mill and carrying a tool bit projecting from the end face of the casing, means being provided for pivoting the tool holder during operation of the end mill to adjust the tool bit to various cutting diameters. In order that this adjustment of the tip of the tool bit may take place substantially in a plane at right angles to the axis of rotation of the end mill, the pivot xais of the tool bit holder is placed at a distance from the rotary axis approximately equal to the average of the greatest and the smallest cutting radii of the tool bit. These radii are defined by means of adjustable abutments which are accessible through suitably covered holes in the wall of the casing.

---

This invention relates to end mills with variable cutting diameter.

In end mills of this type known heretofore, a tool bit is adjustably secured by means of set screws in a tool bit holder adapted to be connected with a rotary spindle. Adjustment of the cutting diameter of the end mill is effected by loosening the set screws and displacing the tool bit at right angles to the axis of the end mill. Of course, this operation cannot be effected while the end mill is running.

However, in several cases it would be desirable to vary the cutting diameter of an end mill during operation thereof. This, for example, holds true in milling machines for routing and trimming printing plates. When routing larger areas of printing plates, a milling cutter having a relatively great diameter may advantageously be used in order to reduce the time required, whereas routing between closely situated text and picture areas of the printing plates requires use of a small diameter mill which can penetrate into all corners without injuring the text and picture areas. Therefore, complete routing of a printing plate often requires exchange of the mill.

It is an object of the present invention to provide an end mill the cutting diameter of which can be varied during operation, so as to avoid the necessity of stopping the milling machine, removing the milling cutter and replacing it by another having a different diameter, when such change of diameter is required.

A further object is to provide an end mill having a tool bit the cutting edge of which is displaceable during operation along a line substantially at right angles to the axis of the end mill.

With these and other objects in view, the invention provides an end mill, comprising a casing adapted to be connected with a rotary spindle for rotation therewith about an axis, a tool bit holder mounted in said casing for pivoting movement about an axis at right angles to said first-named axis, a tool bit secured in said tool bit holder so as to project from an end face of said casing, and means for pivoting said tool bit holder about said pivot axis during rotation of said casing.

Figure 1:
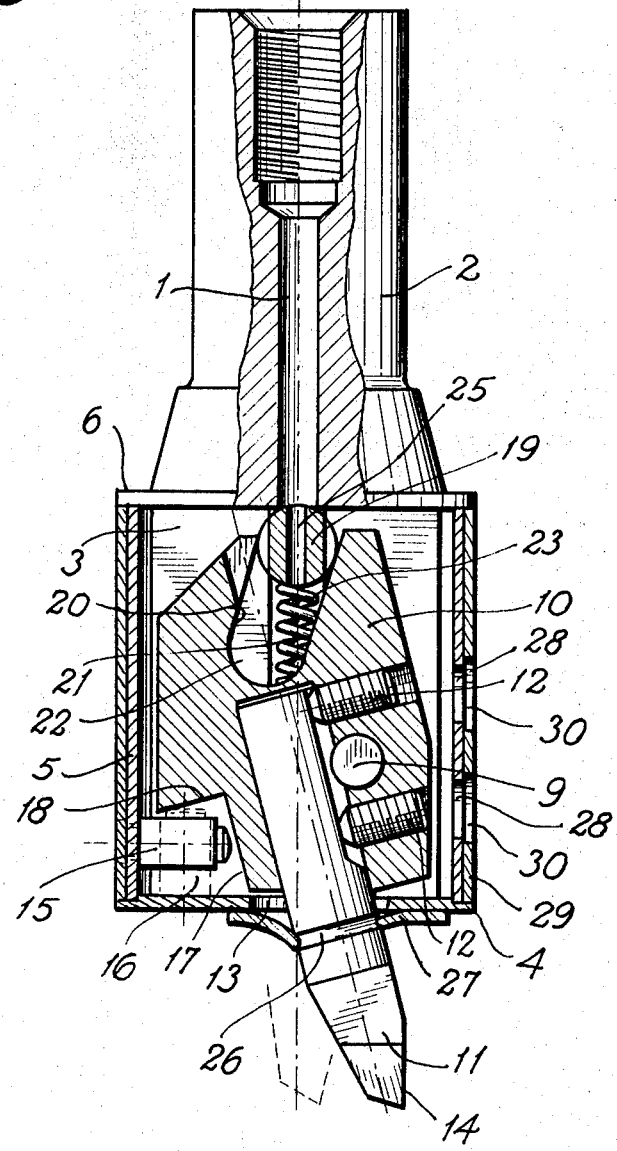
Figure 2:
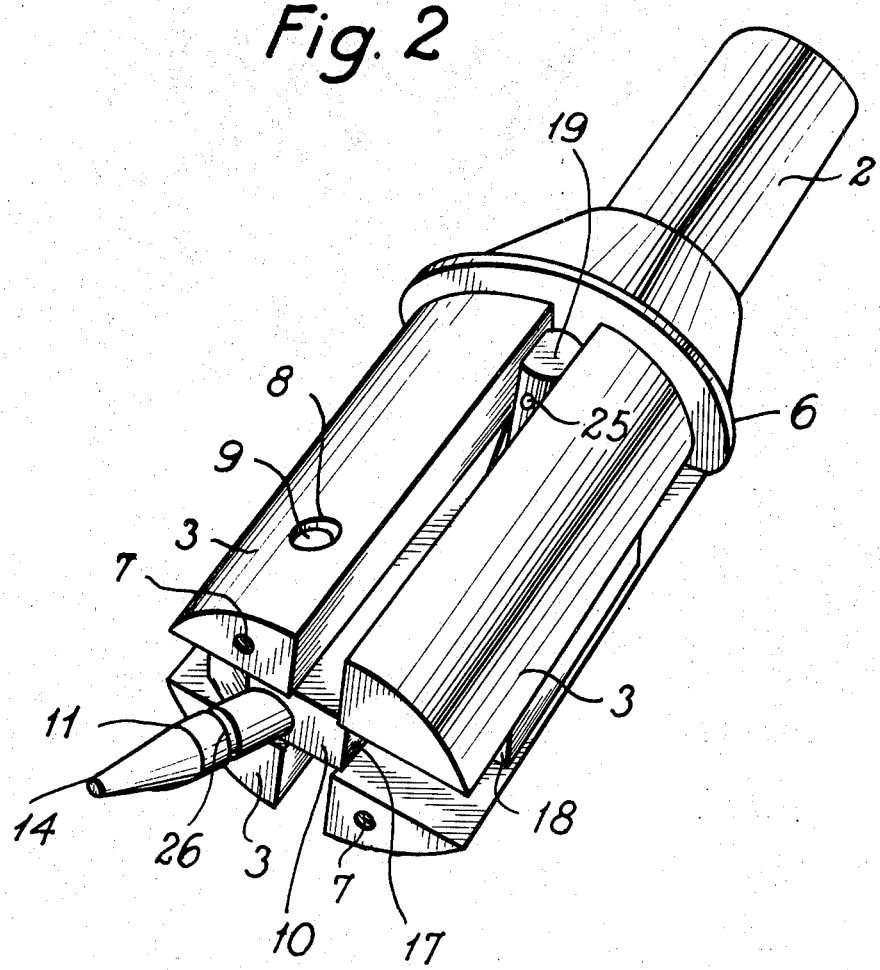

My invention will be described in greater detail hereinafter, reference being had to the accompanying drawings, in which:

FIG. 1 is an axial sectional view of an end mill in accordance with this invention, and FIG. 2 is a perspective view of the same, certain parts of the casing having been removed.

In the drawings, 2 is a shank having an axial bore 1 and adapted to be inserted into a hollow milling spindle for rotation therewith. The shank 2 is integral with a cylindrical body which, through two deep, relatively large recesses at right angles to each other along the axis of the cylindrical body, is divided into four columns 3, each having a substantially sector-shaped cross section (FIG. 2). The casing further comprises a sleeve 5 provided with a bottom 4 and inserted over the cylindrical body constituted by the columns 3 in such a manner as to abut with its rim against a flange 6 at the junction between the shank 2 and the columns 3, and with its bottom 4 against the end faces of the columns 3, to which the bottom is secured by means of screws (not shown) engaging threaded holes 7 in the columns 3 (FIG. 2).

A bore 8 through two of the columns 3 at right angles to the axis of the cylindrical body accommodates a pin 9 upon which a tool bit holder 10 is mounted for pivotal movement in the recess between the columns referred to. The tool bit holder is provided with a bore for receiving a tool bit 11 which is formed as a cylindrical bar having a conically tapered end provided with a cutting edge 14, and which extends with its tapered end through a slot 13 in the bottom 4 in such a manner that the cutting edge 14 is situated at a certain distance from the axis of the casing constituted by parts 3, 4 and 5. As will be obvious from FIG. 1, the cutting edge 14 may be adjusted to a smaller or greater distance from the axis through pivoting movement of the tool bit holder about the axis of the pin 9, as indicated in dotted lines in FIG. 1. The pivotal movement of the tool bit holder is limited by means of abutment screws 15 and 16 screwed into the sleeve 5 and the bottom 4, respectively and adapted to engage abutment faces 17 and 18, respectively, on the tool bit holder.

The axis of the pin 9 is situated at a distance from the axis of the casing corresponding approximately to the average of the greatest and the smallest distances of the cutting edge 14 from the axis of the casing. When the tool bit holder is pivoted about the axis of the pin 9, the pointed end of the tool bit will, thus, be displaced approximately at right angles to the axis of the casing so as to avoid variation of the cutting depth of the end mill.

A cylindrical bar 19 having flattened end portions is arranged parallel with the pin 9 in the spaces between the columns 3, the flattened end portions of the bar being guided between the columns on opposite sides of the tool bit holder 10, and the cylindrical intermediate portion of the bar 19 engaging a recess 22 in the tool bit holder forming opposed, parallel cam faces 20 and 21. As shown in FIG. 1, the bar 19 is situated opposite the bore 1 of the shank 2 and may, accordingly, be displaced axially in the casing 3, 4, 5 by means of a rod (not shown) inserted slidably into the bore 1. The cam faces 20 and 21 are formed with such inclination relative to the axis of the end mill that downward displacement of the bar 19 (FIG. 1) will cause the tool bit holder to pivot in a clockwise direction to diminish the cutting diameter of the mill, until the abutment face 17 of the tool bit holder abuts against the abutment screw 15, or displacement of the bar 19 is in some other way discontinued. The rod arranged in the bore 1 may be hydraulically or pneumatically actuated.

To increase the cutting diameter of the end mill, the tool bit holder 10 is caused to pivot in a counter-clockwise direction by displacement of the bar 19 in an upward direction under the action of a pair of coiled springs 23, of which one only is shown in FIG. 1 and which are supported upon the bottom 4. The springs 23 are guided on long pins 24 which are secured in the bottom 4 and extend on opposite sides of the tool bit holder 10 to engage corresponding cross bores 25 of the bar 19. Withdrawal of the rod in the bore 1 will, thus, cause the bar 19 to move back towards the position indicated in FIG. 1.

As shown in FIG. 1, the spacing of the cam faces 20 and 21 is only slightly larger than the diameter of the bar 19, so as to establish a constant relationship between the displacement of the bar 19 and the pivotal movement of the tool bit holder 10, irrespective of the direction of the displacement.

The tool bit holder 10 and the tool bit 11 are balanced in such a manner that their common center of gravity is situated on the axis of the milling cutter opposite the pin 9, so that, when the tool bit holder is pivoted, this center of gravity is displaced substantially along the axis. Thus, the milling cutter is capable of vibration-free rotation at all adjustments of its cutting diameter.

The slot 13 in the bottom 4 is covered by a disc 27 of flexible material secured in a circumferential groove 26 of the tool bit 11 and engaging with its marginal portion the lower side of the bottom 4 so as to prevent milling chips from penetrating into the casing through the slot 13.

In order to enable the set screws 12 for the tool bit 11 to be loosened and tightened, the circumferential wall 5 of the casing is formed with apertures 28 through which a suitable tool may be introduced to engage the screws 12. The wall 5 is surrounded by a rotatable outer sleeve 29 which is positioned between the flange 6 and a projecting rim of the bottom 4 and provided with apertures 30 corresponding to the apertures 28. Upon tightening of the screws 12, the sleeve 29 is turned relative to the wall 5 so that the apertures 28 and 30 will no more register, and chips are consequently prevented from penetrating through these apertures.

What is claimed is:

1. An end mill, comprising a casing adapted to be connected with a rotary spindle for rotation therewith about an axis, said casing including an end face having an opening formed therethrough, a tool bit holder mounted in said casing for pivoting movement about a pivot axis at right angles to said first named axis, a tool bit secured in said tool bit holder so as to project through said opening in the end face of said casing so that the tool bit extends outwardly from said end face in the same general direction as said first named axis, and means for pivoting said tool bit holder about said pivot axis during rotation of said casing to vary the cutting diameter of said end mill.

2. An end mill as in claim 1, wherein said pivot axis is situated at a distance from said axis of rotation approximately equal to the average of the largest and the smallest cutting radius of the end mill.

3. An end mill, comprising a casing adapted to be connected with a rotary spindle for rotation therewith about an axis, a tool bit holder mounted in said casing for pivoting movement about an axis at right angles to said first named axis, a tool bit secured in said tool bit holder so as to project from an end face of said casing, and means for pivoting said tool bit holder about said pivot axis during rotation of said casing, a shank rigidly connected with said casing for accommodation in a hollow milling spindle, an axial bore in said shank, a rod arranged for axial displacement in said shank, a cam member mounted for axial sliding movement in said casing and adapted to be actuated by said rod, resilient means biassing said cam member towards said rod, and opposed, parallel cam faces on said tool bit holder engaging said cam member for causing pivotal movement of said tool bit holder and said tool bit in accordance with axial displacement of said cam member.

4. An end mill as in claim 1, comprising further a shank rigidly connected with said casing for accommodation in a hollow milling spindle, an axial bore in said shank, a rod arranged for axial displacement in said shank, a cam member mounted for axial sliding movement in said casing and adapted to be actuated by said rod, resilient means biassing said cam member towards said rod, and opposed, parallel cam faces on said tool bit holder engaging said cam member for causing pivotal movement of said tool bit holder and said tool bit in accordance with axial displacement of said cam member.

5. An end mill as in claim 1, comprising screw means in said tool bit holder for securing said tool bit therein, apertures in the circumferential wall of said casing permitting introduction of a tool for engagement with said screw means, and a sleeve rotatably mounted on the circumference of said casing and provided with apertures adapted to register with said first-named apertures in a certain position of said rotatable sleeve.

6. An end mill as in claim 1, wherein said tool bit holder and said tool bit have their common center of gravity situated approximately on said axis of rotation opposite said pivot axis of said tool bit holder.

References Cited

UNITED STATES PATENTS

| | | | |
|---|---|---|---|
| 3,019,712 | 2/1962 | Winberry | 90—11 |
| 3,046,845 | 7/1962 | Cogsdill | 90—11 |

HARRISON I. HINSON, Primary Examiner

U.S. Cl. X.R.
29—105; 77—73.5